United States Patent [19]

McElligott, Jr. et al.

[11] Patent Number: 5,053,149

[45] Date of Patent: Oct. 1, 1991

[54] METHOD FOR DEWAXING OIL AND GAS PIPELINES OR WELLS

[75] Inventors: Paul J. McElligott, Jr., Abington; Stanley R. Sandler, Springfield; John F. Kennoy, Horsham; William J. Tuszynski, Milford Township, Bucks County, all of Pa.

[73] Assignee: Atochem North America, Inc., Philadelphia, Pa.

[21] Appl. No.: 502,094

[22] Filed: Mar. 30, 1990

[51] Int. Cl.$^5$ .................... E21B 37/00; E21B 43/25
[52] U.S. Cl. .................... 252/8.552; 166/300; 166/304; 252/8.553; 252/8.555; 252/389.2; 252/391
[58] Field of Search ................ 166/300, 304; 252/8.552, 8.553, 8.555, 389.2, 391

[56] References Cited

U.S. PATENT DOCUMENTS

| 1,844,883 | 2/1932 | DeGroote | 252/8.552 |
|---|---|---|---|
| 2,267,548 | 12/1941 | Berl | 252/8.552 X |
| 3,241,614 | 3/1966 | Bertness | 166/304 |
| 3,298,907 | 1/1967 | Bauer et al. | 167/23 |
| 3,375,192 | 3/1968 | Rowlinson | 252/8.55 |
| 3,400,104 | 9/1968 | Liggett | 260/79 |
| 3,558,509 | 1/1971 | Wiewiorowski et al. | 252/364 |
| 3,558,510 | 1/1971 | Miller et al. | 252/364 |
| 3,563,315 | 2/1971 | Claytor, Jr. | 166/304 |
| 3,644,433 | 2/1972 | Bichard et al. | 252/364 |
| 3,655,556 | 4/1972 | Allen | 252/389 |
| 3,700,594 | 10/1972 | Lissant | 252/8.55 B |
| 3,724,552 | 4/1973 | Snavely, Jr. et al. | 166/304 |
| 3,732,166 | 5/1973 | Lissant | 166/304 |
| 4,180,469 | 12/1979 | Anderson | 252/390 |
| 4,239,630 | 12/1980 | Atkinson et al. | 252/8.552 |
| 4,379,490 | 4/1983 | Sharp | 166/304 |
| 4,537,684 | 8/1985 | Gallup et al. | 252/8.552 X |
| 4,728,447 | 3/1988 | Labat | 252/8.552 |

OTHER PUBLICATIONS

*Canadian Journal of Chemical Engineering*, 48 (4), pp. 471–473 (1970).

Primary Examiner—Robert L. Stoll
Assistant Examiner—Chhaya Sayala
Attorney, Agent, or Firm—Panitch Schwarze Jacobs & Nadel

[57] ABSTRACT

A process for dissolving wax, paraffin and/or sulfur deposits in an oil or gas pipeline or well comprises providing at the site of the deposit an acid and a compound which liberates carbon disulfide upon contact with the acid, whereby the deposit is dissolved by the liberated carbon disulfide.

13 Claims, No Drawings

METHOD FOR DEWAXING OIL AND GAS PIPELINES OR WELLS

FIELD OF THE INVENTION

The present invention relates to a method for the dewaxing of oil and gas wells and pipelines through the in situ generation of carbon disulfide.

BACKGROUND OF THE INVENTION

The use of carbon disulfide for dewaxing paraffin deposits in oil and gas wells is known in the art. Carbon disulfide has proven effective for this purpose due to its unique ability to solubilize even the most difficult of paraffins. For example, carbon disulfide is able to solubilize paraffins containing 20–30 or more carbon atoms, as well as up to 50% of its weight in sulfur.

However, the use of carbon disulfide in dewaxing oil and gas wells has fallen under disfavor in the oil and gas industry due to safety concerns. Among these safety concerns is the fact that carbon disulfide has a flash point of $-30°$ C. and an autoignition temperature of only 125° C. Accordingly, if a carbon disulfide solution were to be used in the vicinity of an open flame or an ignition source, ignition would be likely. Moreover, carbon disulfide is highly toxic, and exposure thereto may lead to neurological damage. In view of these factors, the oil and gas industry has attempted to avoid carbon disulfide use.

In light of the inherent dangers of carbon disulfide, research has been conducted to attempt to reduce the hazards associated with its use. Generally, these methods have addressed the autoignition temperature of carbon disulfide. However, none has effectively addressed the flammability problems.

For example, U.S. Pat. No. 3,298,907 discloses a blend of carbon disulfide and chlorofluorocarbons which raises the autoignition temperature of carbon disulfide. Although these blends have proven effective in raising the autoignition temperature of carbon disulfide, they have no effect on the flash point thereof. Also, these blends are costly and environmentally dangerous due to the excessive chlorofluorocarbon (15–60 percent be weight) and methylene chloride (20–60 percent by weight) content.

Further attempts have been made to raise the autoignition temperature of carbon disulfide through the addition of various other hydrocarbons. For example, U.S. Pat. No. 3,375,192 discloses a method whereby 4 to 16 percent by weight of pentane is added to a carbon disulfide solution to raise the autoignition temperature from 115° C. to 357° C.

Also, it has been discovered that light alkenes, such as isoprene, are effective in raising the autoignition temperature of carbon disulfide (see J. B. Hyne and J. W. Greidanus, *Canadian Journal of Chemical Engineering*, 48 (4) pp. 471–473 (1970)). Specifically, the use of isoprene at a concentration of 5 percent by weight, was found to raise the autoignition temperature of carbon disulfide to higher than 300° C.

In U.S. Pat. No. 3,644,433, it was disclosed that a mixture of carbon disulfide and 5–40 percent of cracked or coke naphtha containing significant amounts of unsaturation significantly raised the autoignition temperature of carbon disulfide.

Another method for raising the autoignition temperature of carbon disulfide comprises blending the carbon disulfide with organo-sulfur chemicals. For example, U.S. Pat. No. 3,558,509 described in examples that the addition of 0.1–1.0 percent by weight of dimethylsulfoxide, alkylsulfides or disulfides (having an alkyl chain length of up to 5 carbons) to carbon disulfide elevates the autoignition temperature of the carbon disulfide to greater than about 150° C.

It is also known that the addition of halogens or ethanol to carbon disulfide effectively raises its autoignition temperature. For example, U.S. Pat. No. 3,558,510 discloses that the use of one percent by weight of iodine or bromine or six percent by weight of ethanol raises the autoignition temperature of carbon disulfide to greater than about 150° C. However, the use of halogens in oil an gas well applications has fallen upon disfavor, due to the significant corrosion problems associated therewith.

Further attempts to adjust the autoignition temperature of carbon disulfide include the use of emulsions. For example, U.S. Pat. Nos. 3,700,594 and 3,732,166 disclose that non-Newtonian microemulsions of carbon disulfide in water have a higher autoignition temperature than carbon disulfide solutions alone. The use of such emulsions for treating oil and gas wells is also disclosed. Although such emulsions have been shown to decrease the flammability of carbon disulfide solutions, they have proven to be unstable, i.e. phase saturation occurs upon long-term storage.

However, these references do not recognize that carbon disulfide mixtures also have very low flash points. For example, n-pentane has a flash point of $-40°$ F. (see U.S. Pat. No. 3,375,192). The flash point is the temperature at which ignition occurs with an open flame. The ignition temperature is always much higher than the flash point, since it measures temperatures at which the vapor mixed with air will ignite on a hot surface.

In view of the failure of these attempts to produce carbon disulfide compositions which may be handled without the inherent dangers of ignition described above, a method for the in situ production of carbon disulfide would be valuable.

In addition to the inherent dangers of ignition possessed by carbon disulfide solutions, another disadvantage of handling free carbon disulfide is its toxicity. A method for the in situ production of carbon disulfide would be advantageous in that it would avoid the toxic exposure of workers handling free carbon disulfide.

Sodium tetrathiocarbonate and other members of the thiocarbonate family are known to generate carbon disulfide under certain conditions. For example, U.S. Pat. No. 3,400,104 discloses the use of this salt in the synthetic preparation of various polymeric organic carbon disulfides. French Patent 1,540,473 discloses the use of peroxythiocarbonates as polymerization inhibitors. However, the use of these salts for the in situ generation of carbon disulfide, particularly in a method for dewaxing oil and gas wells, has been heretofore unknown in the art.

It can be seen that there is a need for a method of dewaxing oil and gas wells and pipelines which will allow for the safe use of carbon disulfide.

SUMMARY OF THE INVENTION

According to the present invention, there is provided a process for dissolving wax, paraffin and/or sulfur deposits in an oil or gas pipeline or well comprising providing at the site of the deposit an acid and a compound which liberates carbon disulfide upon contact with the acid, whereby the deposit is dissolved by the liberated carbon disulfide. Preferably, the compound is selected from compounds of Formula I or Formula II, wherein Formula I is represented by:

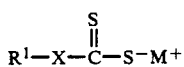
(I)

wherein X is oxygen, sulfur or a disulfide group; $R^1$ is hydrogen, $-NH_4$, a Group IA or IIA cation, an alkyl ammonium group, an alkyl phosphonium group, an aryl ammonium group, an aryl phosphonium group, an alkyl group, an aryl group, or an alkaryl group; and $M^+$ is a Group IA or IIA cation, $-NH_4$, an alkyl ammonium group, an aryl ammonium group, an alkyl phosphonium group, or an aryl phosphonium group; and Formula II is represented by:

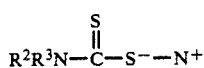
(II)

wherein $M^+$ is as defined above; and $R^2$ and $R^3$ are independently hydrogen, hydroxyalkyl, alkyl, aryl, alkyaryl, alkoxyalkyl, or alkoyxyaryl, or $R^2$ and $R^3$ may together comprise a 3 to 7 membered heterocyclic ring in which nitrogen is the hetero atom(s).

DETAILED DESCRIPTION OF THE INVENTION

In the present process for dissolving wax, paraffin and/or sulfur deposits in an oil or gas pipeline or well, an aqueous or alcoholic solution of the salt of a compound capable of generating carbon disulfide is combined with an acid, causing the generation of carbon disulfide. When used in the dewaxing of wax, paraffin or sulfur deposits, the in'situ generation of carbon disulfide isolates the carbon disulfide at the point of the deposit, and eliminates exposure to workers in handling and transportation.

Of the acids which may be effectively used in the present process, any acid may be used which will cause the liberation of carbon disulfide upon contact with a solution comprising the compound capable of generating carbon disulfide by delivering a proton to the compound. Accordingly, the present invention encompasses quite a large number of acids. However, it is preferred that mineral acids or strong organic acids be used as the acid of the present method.

For example, typical mineral acids which may be used in the present method are hydrochloric, hydrobromic, hydrofluoric, sulfuric and phosphoric acids. Hyrdochloric or phosphoric acids are preferred.

Typical strong organic acids which may be used in the present method are sulfonic acids, such as methanesulfonic acid and para-toluenesulfonic acid, and carboxylic acids. Other strong organic acids may also be used, such as oxalic acid, trichloroacetic acid, and trifluoroacetic acids. Preferably, methanesulfonic acid, para-toluenesulfonic acid or oxalic acid are used.

Preferably, an aqueous or alcoholic solution of the salt of a compound capable of generating carbon disulfide is added to the acid. This order of addition is preferable in order to obtain a greater yield of carbon disulfide. The addition of the acid to the compound capable of generating carbon disulfide may result in sulfur precipitation, evolution of hydrogen sulfide and a lesser degree of carbon disulfide generation.

As the compound capable of generating carbon disulfide, there may be used those compounds represented by Formulae I and II set forth below:

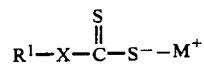
(I)

wherein X is oxygen, sulfur or a disulfide group; $R^1$ is hydrogen, $-NH_4$, a Group IA or IIA cation, an alkyl ammonium group, an alkyl phosphonium group, an aryl ammonium group, an aryl phosphonium group, an alkyl group, an aryl group, or an alkaryl group; and $M^+$ is a Group IA or Group IIA cation, $-NH_4$, an alkyl ammonium group, an aryl ammonium group, an alkyl phosphonium group, or an aryl phosphonium group; and

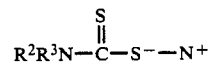
(II)

wherein $M^+$ is as defined above; and $R^2$ and $R^3$ are independently hydrogen, hydroxyalkyl, alkyl, aryl, alkaryl, alkoxyaryl or alkoxyalkyl, or R2 and R3 may together comprise a 3 to 7 membered heterocyclic ring in which nitrogen is the hetero atom(s).

Preferably, the acid solution should be injected into the pipeline or well first, with the solution of the compound capable of liberating carbon disulfide being injected directly into the acid solution.

In Formula II set forth above, the 3 to 7 membered ring is preferably a piperidino, pyrrolidino, morpholino, or piperazino ring.

The alkyl, aryl and alkaryl groups represented by $R^1$ also contain about 1 to 25, and preferably about 1 to 12 carbon atoms.

The alkyl, aryl, alkaryl, alkoxyaryl and alkoxyalkyl groups represented by $R^2$ and $R^3$ contain about 1 to 25, and preferably about 1 to 12 carbon atoms.

As the compounds capable of generating carbon disulfide, salts of the entire thiocarbonate family, dithiocarbamates and xanthic acids may be used. Preferably, the compound is selected from the group consisting of salts of di-, tri- and tetra-thiocarbonic acids and salts of xanthic acids. More preferably, the compound is sodium dimethyl dithiocarbamate As indicated above, the solution comprising the compound capable of liberating carbon disulfide is an aqueous or alcoholic solution of the salts of these compounds. Aqueous solutions are particularly preferred from the viewpoint of solubility and safety. Solutions of these compounds are preferred due to their ease of handling. These solutions contain the compound capable of generating carbon disulfide in an amount of from about 15% by weight to an amount just below the saturation point of the solution, and preferably contains from about 35% to about 50% by weight of the compound. The amount of the compound capable of generating carbon disulfide present in such a solution is variable, dependent upon the particular compound used, the reaction temperature, etc. However, appropriate amounts will be evident to one skilled in the art based upon the present disclosure.

Generally, the cations used to form the salts of the compounds capable of generating carbon disulfide, or $M^+$ in Formulae I and II, may vary depending upon the degree of solubility required in the aqueous or alcoholic solutions. For example, the cations may include metals, such as sodium, calcium, magnesium and lithium, as well as all other metals in Group IA and IIA of the Periodic Table. Preferably, $M^+$ comprises a metal cation selected from the group consisting of sodium, calcium, magnesium and lithium.

In addition to the metal cations discussed above, ammonium or phosphonium ions may also be used for forming the salt of the compounds capable of generating carbon disulfide. More specifically, $M^+$ may comprise alkyl ammonium groups, aryl ammonium groups, alkyl phosphonium groups and aryl phosphonium groups. These ions may include mono-, di-, tri- and tetra-substituted ammonium or phosphonium ions. The alkyl and aryl groups of these cations may contain from about 1 to about 25 carbon atoms, and preferably from about 1 to about 12 carbon atoms. The use of these ions is preferred when using an organic solvent to form the solution, due to their increased solubility in such solvents, such as methanol.

The present process provides for the liberation of carbon disulfide in order to cause the dewaxing of oil and gas pipelines or wells. As noted above, carbon disulfide is particularly advantageous for this purpose due to its high solubilizing effect on waxes and paraffins having a high carbon number, as well as sulfur. Since the present process eliminates the handling of pure carbon disulfide, the flammability and health problems common to the use of carbon disulfide are eliminated.

The process for dewaxing oil and gas pipelines or wells according to the present invention comprises injecting into the oil or gas pipeline or well at the site of a wax, paraffin or sulfur deposit, an aqueous or alcoholic solution of the salt of a compound capable of generating carbon disulfide represented by Formulae I and II and an acid. The solutions will react causing the immediate generation of carbon disulfide. The carbon disulfide thus produced contacts the wax, paraffin or sulfur deposit, causing the dissolution thereof.

Preferably, in the present process, the acid solution is first injected into the pipeline or well at the point where the wax, paraffin, or sulfur deposit exists. Next, an aqueous or alcoholic solution of a salt of a compound capable of generating carbon disulfide is injected into the acid solution. Immediate generation of carbon disulfide occurs, causing dissolution or uptake of the deposit.

The temperature of the pipeline or well wherein the dewaxing process is undertaken should be maintained at any temperature favorable toward dissolving a wax, sulfur, or paraffin deposit. Generally, the temperature is not critical and may be varied as deemed necessary by one skilled in the art.

The rate at which the solution of the compound capable of generating carbon disulfide is added to the acid is quite variable. However, preferably, the solution of the compound is injected as rapidly as possible to the site of the deposit and into the acid solution. The reaction appears to go to completion when the compound is added to the acid.

The appropriate molar ratio of acid to solution of the compound capable of generating carbon disulfide is also highly variable. However, it is preferable to inject an excess amount of acid in the situation where additional carbon disulfide generation is desired in order to complete the dewaxing. Therefore, in the present process, the molar ratio of acid to the compound capable of generating carbon disulfide is 100:1 to 1.1:1, and preferably 6:1 to 2:1.

The present invention will now be illustrated by reference to the following specific, non-limiting examples.

EXAMPLE 1

A 250ml round bottom 3-neck flask was placed upon a magnetic stirrer. The flask was fitted with a rubber septum, a 50ml pressure equilibrated addition funnel, and a Claisen Y-tube fitted with a thermowell, a thermocouple, and a jacketed water-cooled condenser. The condenser was fitted with a silicon fluid gas bubbler. The bubbler was attached on its vent side to an empty Erlenmeyer trap flask and on its opposing side to a second Erlenmeyer fitted with a dip tube at its inlet, the dip tube being immersed in 10% aqueous caustic (containing a magnetic stirring bar) to trap and scrub hydrogen sulfide gas. The final Erlenmeyer flask was placed on a magnetic stirrer to increase the efficiency of the caustic reaction to the hydrogen sulfide. 25.1 grams of a 30% aqueous solution of disodium tetrathiocarbonate (40.4 millimoles) was charged into the round bottom flask. 51.1 grams of 7.3% dilute hydrochloric acid (102.2 millinoles) was then added to the addition funnel.

Addition of the acid over a 15 minute period to the stirring aqueous salt solution (maintained at 25° C.) resulted in the evolution of a small undetermined volume of unidentified gas, as well as yellow solids. No free carbon disulfide droplets were observed.

EXAMPLE 2

Identical equipment was used as described in Example 1.

100 grams of 7.3% dilute hydrochloric acid solution (200 millimoles) was added to the round bottom flask. Then 37.6 grams (60.4 millimoles) of 30% aqueous disodium tetrathiocarbonate solution was added to the addition funnel. Slow addition of the aqueous thiocarbonate to the acid solution over 15 minutes produced gas evolution and a yellow oil which separated out below the acid solution. The evolved gas was identified as hydrogen sulfide. The yellow oil (2.7 grams) was identified as carbon disulfide by gas chromatography. This oil was then flash evaporated to yield 0.2 grams of a yellow solid identified as sulfur. The remaining oil weighed 2.5 grams, representing a carbon disulfide yield of 51.0%.

Accordingly, in comparing the results of Example 2 to that of Example 1, it can be seen that when added to the acid solution in accordance with the preferred process of the present invention, the solution of the compound capable of generating carbon disulfide (specifically in Examples 1 and 2 disodium tetrathiocarbonate) achieves a significantly higher amount of carbon disulfide generation in comparison to the situation where the order of mixing is reversed.

EXAMPLE 3

The identical equipment to that used in Example 1 was employed in Example 3. 100 grams (161 millimoles) of 30% aqueous disodium tetrathiocarbonate solution was added to the addition funnel. 200 grams (400 millimoles) of 7.3% dilute hydrochloric acid solution was added to the round bottom flask. 5 grams of solid Shell Wax-300 ®was also added to the round bottom flask The aqueous solution of thiocarbonate was then added to the stirring acid and wax mixture at 25° C. over a 10 minute period.

After the addition of the aqueous solution of thiocarbonate, the wax was observed to dissolve. No free carbon disulfide layer or sulfur precipitation was observed. However, a gas, which was determined by testing with lead acetate indictor paper to be hydrogen sulfide, appeared to evolve from the mixture.

EXAMPLE 4

The identical equipment was used in Example 4 as in Example 1.

100 grams (161 millimoles) of 30% aqueous disodium tetrathiocarbonate solution was added to the addition funnel. 200 grams (400 millimoles) of 7.3% dilute hydrochloric acid solution was added to the round bottom flask. 2 grams of solid Shell Wax-300 ®was then added to the round bottom flask. The thiocarbonate solution was added over a period of 24 minutes to the mixture of acid and wax. This mixture was stirred and maintained at 24° C.

The wax softened and flowed immediately upon the addition of the thiocarbonate solution. A lower carbon disulfide layer (yellow) was observed with the flowing wax. The wax emulsion generated by this process was determined by evaporation to be 20% by weight of wax and 80% by weight of carbon disulfide.

EXAMPLE 5

8.2 grams of ethyl xanthic acid potassium salt was made up to 40.0 grams with water. This solution was then rapidly added dropwise over a 3 minute period at room temperature to 102.2 grams of 7.2% aqueous hydrochloric acid to give a milky white solution. After 10 minutes of stirring, the solution was allowed to settle. 3.0 grams of an orange amber liquid layer settled. A gas chromatographic analysis of this material indicated that it was $CS_2$.

EXAMPLE 6

11.2 grams of sodium diethyldithiocarbamate was made up to 56.1 grams with water. This solution was then added dropwise to 100 grams of 7.2% aqueous hydrochloric acid at room temperature over a 10 minute period. Droplets of $CS_2$ appeared on the walls of the flask. After 15 minutes of stirring, two layers appeared. A gas chromatographic analysis indicated that $CS_2$ was produced.

The present invention may be embodied in other specific forms without departing from the spirit or essential attributes thereof and, accordingly, reference should be made to the appended claims, rather than to the foregoing specification as indicating the scope of the invention.

We claim:

1. A process for dissolving a deposit of wax, paraffin or sulfur or mixtures thereof in an oil or gas pipeline or well comprising first providing by addition at the site of said deposit an acid, and thereafter providing at the site a compound which liberates carbon disulfide upon contact with said acid, whereby said deposit is dissolved by the liberated carbon disulfide, said compound represented by Formula I:

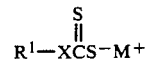

wherein X is a disulfide group; $R^1$ is hydrogen, $-NH_4$, a Group-IA or IIA cation, an alkyl ammonium group, an alkyl phosphonium group, an aryl ammonium group, an aryl phosphonium group, an alkyl group, an aryl group or an alkaryl group; $M^{30}$ is a Group IA or IIA cation, $-NH_4$, an alkyl ammonium group, an aryl ammonium group, an alkyl phosphonium group or an aryl phosphonium group; wherein said alkyl, aryl and alkaryl groups contain about 1 to 25 carbon atoms; with the proviso that when $R^1$ is a Group IIA cation $M^+$ is absent.

2. A process as in claim 1, wherein said compound is provided in an aqueous solution.

3. A process as in claim 1, wherein $M^+$ comprises a metal cation selected from the group consisting of sodium, calcium, magnesium and lithium.

4. A process as in claim 1, wherein said acid is selected from the group consisting of mineral acids and strong organic acids.

5. A process as in claim 4, wherein said mineral acid is selected from the group consisting of HCl, HBr, $H_2SO_4$, HF and $H_3PO_4$.

6. A process as in claim 4, wherein said strong organic acid is selected from the group consisting of carboxylic acids and sulfonic acids.

7. A process for dewaxing oil and gas pipelines or wells comprising first injecting into said oil or gas pipeline at the site of a deposit of wax, paraffin or sulfur or mixtures thereof an acid, and thereafter providing at the site a compound which liberates carbon disulfide upon contact with said acid, whereby said deposit is dissolved by the liberated carbon disulfide, said compound represented by Formula I:

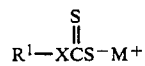

wherein X is a disulfide group; $R^1$ is hydrogen, $-NH_4$, a Group-IA or IIA cation, an alkyl ammonium group, an alkyl phosphonium group, an aryl ammonium group, an aryl phosphonium group, an alkyl group, an aryl group or an alkaryl group; $M^+$ is a Group IA or IIA cation, $-NH_4$, an alkyl ammonium group, an aryl ammonium group, an alkyl phosphonium group or an aryl phosphonium group; wherein said alkyl, aryl and alkaryl groups contain about 1 to 25 carbon atoms; with the proviso that when $R^1$ is a Group IIA cation $M^+$ is absent.

8. A process as in claim 7, wherein said compound is provided in an aqueous solution.

9. A process as in claim 7, wherein $M^+$ comprises a metal cation selected from the group consisting of sodium, calcium, magnesium and lithium.

10. A process as in claim 7, wherein said acid is a mineral acid.

11. A process as in claim 10, wherein said mineral acid is selected from the group consisting of HCl, HBr, $H_2SO_4$, HF and $H_3PO$.

12. A process as in claim 7, wherein said acid is a strong organic acid.

13. A process as in claim 12, wherein said strong organic acid is selected from the group consisting of carboxylic acids and sulfonic acids.

* * * * *